(12) United States Patent
Misumi et al.

(10) Patent No.: US 11,878,478 B2
(45) Date of Patent: Jan. 23, 2024

(54) PREPREG, LAMINATE, AND MOLDING

(71) Applicant: Toray Industries, Inc., Tokyo (JP)

(72) Inventors: Jun Misumi, Ehime (JP); Masato Honma, Ehime (JP); Kyoko Shinohara, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 58 days.

(21) Appl. No.: 17/611,697

(22) PCT Filed: May 15, 2020

(86) PCT No.: PCT/JP2020/019469
§ 371 (c)(1),
(2) Date: Nov. 16, 2021

(87) PCT Pub. No.: WO2020/235487
PCT Pub. Date: Nov. 26, 2020

(65) Prior Publication Data
US 2022/0213284 A1 Jul. 7, 2022

(30) Foreign Application Priority Data
May 23, 2019 (JP) .................. 2019-097034

(51) Int. Cl.
*B29C 70/00* (2006.01)
*B29C 70/06* (2006.01)
(Continued)

(52) U.S. Cl.
CPC ........ *B29C 70/003* (2021.05); *B29C 70/0035* (2021.05); *B29C 70/06* (2013.01);
(Continued)

(58) Field of Classification Search
CPC .... B29K 2995/0072; B29K 2995/0046; B29K 2995/0077; B29K 2995/0082;
(Continued)

(56) References Cited

U.S. PATENT DOCUMENTS 8,415,007 B2   4/2013   Honma et al.
9,963,576 B2   5/2018   Tsuchiya et al.
(Continued)

FOREIGN PATENT DOCUMENTS

JP    08259713 A    10/1996
JP    10138354 A    5/1998
(Continued)

OTHER PUBLICATIONS

Polyethermide, Wikipedia, accessed online Mar. 27, 2023.*
(Continued)

*Primary Examiner* — Camie S Thompson
(74) *Attorney, Agent, or Firm* — RATNERPRESTIA

(57) ABSTRACT

The present invention aims at providing a prepreg for producing a laminate suitable as a structural material, and a laminate, which have excellent tensile shear joining strength, fatigue joining strength, and interlaminar fractural toughness values, and can be firmly integrated with another structural member by welding. The present invention is a prepreg including the following structural components [A], [B], and [C], wherein [C] is present on a surface of the prepreg, [C] is a crystalline thermoplastic resin having a glass transition temperature of 100° C. or higher or an amorphous thermoplastic resin having a glass transition temperature of 180° C. or higher, and the reinforcing fibers [A] are present which are included in a resin area including [B] and a resin area including [C] across an interface between the two resin areas: [A] reinforcing fibers; [B] a thermosetting resin; and [C] a thermoplastic resin.

23 Claims, 2 Drawing Sheets

(51) Int. Cl.
    *C08J 5/04*          (2006.01)
    *B29C 70/30*       (2006.01)
    *C08J 5/24*          (2006.01)
    *B29K 71/00*       (2006.01)
    *B29K 79/00*       (2006.01)
    *B29K 105/08*     (2006.01)
    *B29K 105/12*     (2006.01)

(52) U.S. Cl.
    CPC ................ *B29C 70/30* (2013.01); *C08J 5/04* (2013.01); *C08J 5/243* (2021.05); *C08J 5/249* (2021.05); *B29K 2071/00* (2013.01); *B29K 2079/085* (2013.01); *B29K 2105/0872* (2013.01); *B29K 2105/12* (2013.01)

(58) Field of Classification Search
    CPC ........... B29K 2307/04; B29K 2071/00; B29K 2105/0872; B29K 2105/12; B29K 2079/085; B32B 27/00; B29C 70/003; B29C 70/0035; B29C 70/06; B29C 70/30; B29C 70/18; B29C 70/88; C08J 5/249; C08J 5/04; C08J 5/243
    USPC ....... 428/297.4, 411.1, 474.4, 480, 412, 500, 428/423.1, 522, 523, 292.1
    See application file for complete search history.

(56) References Cited

U.S. PATENT DOCUMENTS

2006/0110599 A1*  5/2006  Honma ................ H05K 9/009
                                                428/522
2022/0315762 A1*  10/2022  Shinohara ................ C08J 5/243
2022/0324184 A1*  10/2022  Misumi ................... B29C 70/88

FOREIGN PATENT DOCUMENTS

| JP | 2006049878 A | 2/2006 |
| JP | 3906319 B2 | 4/2007 |
| JP | 2007092072 A | 4/2007 |
| JP | 2009062473 A | 3/2009 |
| JP | 2018161801 A | 10/2018 |
| WO | 2005082982 A1 | 9/2005 |

OTHER PUBLICATIONS

International Search Report and Written Opinion for International Application No. PCT/JP2020/019469, dated Jul. 28, 2020, 8 pages.
Extended European Search Report for European Application No. 20809607.3, dated May 16, 2023, 8 pages.

* cited by examiner

PREPREG, LAMINATE, AND MOLDING

CROSS REFERENCE TO RELATED APPLICATIONS

This is the U.S. National Phase application of PCT/JP2020/019469, filed May 15, 2020, which claims priority to Japanese Patent Application No. 2019-097034, filed May 23, 2019, the disclosures of each of these applications being incorporated herein by reference in their entireties for all purposes.

FIELD OF THE INVENTION

The present invention relates to a prepreg in which reinforcing fibers are impregnated with a thermosetting resin and a thermoplastic resin, and a laminate or an integrated molding including a thermosetting resin, a thermoplastic resin, and reinforcing fibers.

BACKGROUND OF THE INVENTION

Fiber-reinforced composite materials in which a thermosetting resin or a thermoplastic resin is used as a matrix and is combined with reinforcing fibers such as carbon fibers or glass fibers are lightweight, and have excellent mechanical characteristics such as strength and rigidity, heat resistance, and corrosion resistance, and therefore have been applied to many fields such as aerospace, automobiles, railway vehicles, ships, civil engineering and construction, and sporting goods. These fiber-reinforced composite materials, however, are unsuitable for producing parts or structures having a complicated shape in a single molding process, and in the above applications, it is necessary to produce a member including a fiber-reinforced composite material and then to integrate the member with another member. Mechanical joining methods using bolts, rivets, or screws, and joining methods using an adhesive are used as a method for integrating the fiber-reinforced composite material including the reinforcing fibers and the thermosetting resin with the other member. The mechanical joining method has disadvantages in which a production process is prolonged and a production cost is increased because a process in which a joint is previously processed, such as drilling, is necessary, and the strength of the material is deteriorated because of the drilling. The joining method using the adhesive has disadvantages in which the production process is prolonged because the method requires a bonding process including preparation of an adhesive and coating of the adhesive, and a curing process, and the sufficient reliability in bonding strength cannot be obtained.

To the fiber-reinforced composite material using a thermoplastic resin as a matrix can be applied a method for joining members by welding, in addition to the methods of integrating the fiber-reinforced composite material including the reinforcing fibers and the thermosetting resin with the other member as described above, and thus the time required for joining the members may possibly be shortened. On the other hand, when the mechanical characteristics in a high temperature and high humidity environment, and excellent chemical resistance are required as in structural members for aircrafts, there is a problem of insufficient heat resistance and chemical resistance as compared with the fiber-reinforced composite material including the thermosetting resin and the reinforcing fibers.

Here, Patent Document 1 shows a method for joining a fiber-reinforced composite material including a thermosetting resin and reinforcing fibers through an adhesive.

Patent Document 2 shows a method for integrating a member formed from a thermoplastic resin with a member formed from a fiber-reinforced composite material including a thermosetting resin. That is, a thermoplastic resin film is laminated on a surface of a prepreg sheet including the reinforcing fibers and the thermosetting resin, and heated and pressurized to obtain a fiber-reinforced composite material. Thereafter, the obtained fiber-reinforced composite material is put in a mold, a thermoplastic resin is injection-molded, and the thermoplastic resin member, formed by the injection molding, is joined to the fiber-reinforced composite material.

In addition, Patent Document 3 shows a method for producing a laminate in which a thermoplastic resin adhesive layer is formed on a surface of a composite material including a thermosetting resin and reinforcing fibers, and describes that the laminate exhibits an adhesion effect with another member through the thermoplastic resin.

Patent Document 4 shows a prepreg in which particles, fibers, or films including a thermoplastic resin are disposed on a surface layer of a prepreg including reinforcing fibers and a thermosetting resin, and a fiber-reinforced composite material thereof. It is shown that the prepreg and the fiber-reinforced composite material have an improved interlaminar fractural toughness value.

PATENT DOCUMENTS

Patent Document 1: Japanese Patent Laid-open Publication No. 2018-161801
Patent Document 2: Japanese Patent Laid-open Publication No. 10-138354
Patent Document 3: Japanese Patent No. 3906319
Patent Document 4: Japanese Patent Laid-Open Publication No. 8-259713

SUMMARY OF THE INVENTION

The method disclosed in Patent Document 1, however, is a method for joining fiber-reinforced composite materials including reinforcing fibers and a thermosetting resin to each other using an adhesive, and welding cannot be applied to the method for joining the fiber-reinforced composite materials as they are, because the thermosetting resin is a matrix resin; and there is a problem of joining process needing time because the curing of the adhesive needs time, and further, the joining strength exhibited is insufficient.

According to the method described in Patent Document 2, the joining strength is insufficient at the joint between the thermosetting resin and the thermoplastic resin film in the fiber-reinforced composite material.

The fiber-reinforced composite material according to Patent Document 3 can be integrated by welding through the thermoplastic resin, and exhibits excellent joining strength at room temperature, but has the insufficient joining strength in a high temperature and high humidity environment.

According to the method described in Patent Document 4, the joining strength is insufficient when the joining method by welding is used.

Therefore, an object of the present invention is to provide a prepreg, a laminate, and an integrated molding, which can be joined to the same or different kind of member by welding, exhibit excellent joining strength (tensile shear joining strength) and high fatigue joining strength at room temperature and in a high temperature and high humidity environment, further have excellent interlaminar fractural toughness value, and provide a laminate suitable as a structural material.

That is, the present invention according to an exemplary embodiment is a prepreg including the following structural components [A], [B], and [C], wherein [C] is a crystalline thermoplastic resin having a glass transition temperature of 100° C. or higher or an amorphous thermoplastic resin having a glass transition temperature of 180° C. or higher, [C] is present on a surface of the prepreg, and the reinforcing fibers [A] are present included in a resin area including [B] and a resin area including [C] across an interface between the two resin areas:
[A] reinforcing fibers;
[B] a thermosetting resin; and
[C] a thermoplastic resin.

The present invention according to an embodiment is also a laminate wherein a prepreg of the present invention forms at least a part of layers in the state of a cured product.

The present invention according to an embodiment is also a laminate including a layer including the following structural components [A], [C], and [D], wherein [C] is a crystalline thermoplastic resin having a glass transition temperature of 100° C. or higher or an amorphous thermoplastic resin having a glass transition temperature of 180° C. or higher, and the reinforcing fibers [A] are present included in a resin area including [C] and a resin area including [D] across an interface between the two resin areas:
[A] reinforcing fibers;
[C] a thermoplastic resin; and
[D] a cured product of a thermosetting resin.

The present invention according to an embodiment is also a molding including a laminate according to the present invention, wherein the laminate is integrated with another member by joining the member to a surface of a structural component [C].

The prepreg and the laminate according to embodiments of the present invention use the thermosetting resin and the thermoplastic resin and the resins are firmly joined to each other, and the prepreg can be well welded to the same or different kind of member, and thus, the time required for the joining process can be shortened and the molding speed of the structural members can be increased, as compared with conventional fiber-reinforced composite materials including a thermosetting resin and reinforcing fibers. In addition, when the laminate and the member are joined to form an integrated molding, excellent fatigue joining strength and joining strength in a high temperature and high humidity environment are exhibited, and an excellent laminate as a structural material is obtained, and when applying it to aircraft structural members, wind turbine blades, automobile structural members, computer applications such as IC trays and housings of notebook computers, it is possible to exhibit excellent performance as a structural; furthermore it is possible to greatly reduce the molding time and molding cost of products in the applications described above.

DETAILED DESCRIPTION OF EMBODIMENTS OF THE INVENTION

Figure 1:
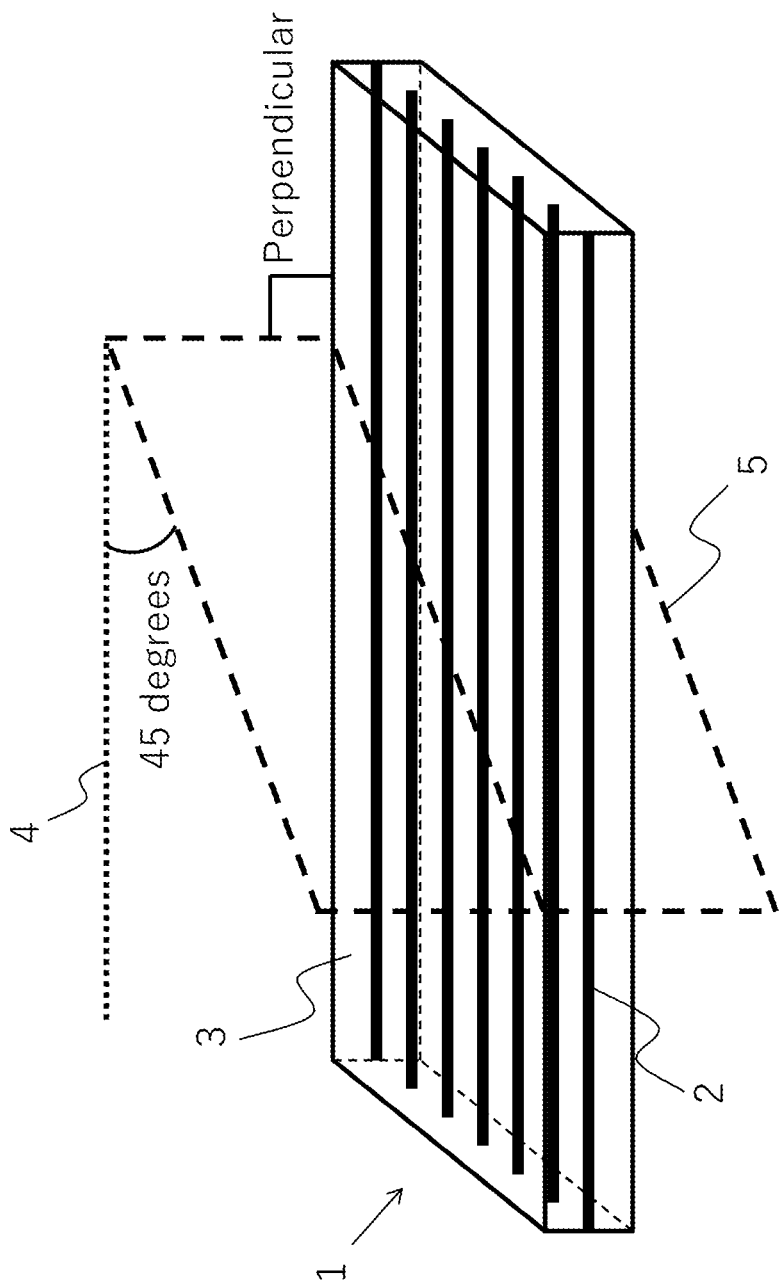
FIG. 1 is a schematic view showing a prepreg or a laminate according to an embodiment of the present invention, and showing a cross-section perpendicular to a prepreg plane or a laminate in FIG. 2.

The prepreg according to an embodiment of the present invention includes the following structural components [A], [B], and [C]:
[A] reinforcing fibers;
[B] a thermosetting resin; and
[C] a thermoplastic resin.

<Structural Component [A] Reinforcing Fibers>

The reinforcing fibers, the structural component [A], used in the present invention, may include glass fibers, carbon fibers, metal fibers, aromatic polyamide fibers, polyaramid fibers, alumina fibers, silicon carbide fibers, boron fibers, basalt fibers, and the like. They may be used alone or in combination of two or more, as appropriate. The reinforcing fibers may be subjected to a surface treatment. The surface treatment may include a metal deposition treatment, a treatment using a coupling agent, a treatment using a sizing agent, an additive deposition treatment, and the like. The reinforcing fibers may include reinforcing fibers having conductivity. As the reinforcing fibers, the carbon fibers are preferably used because of the low specific gravity, high strength, and high elastic modulus.

Commercially available products of the carbon fiber may include "TORAYCA (registered trademark)" T800G-24K, TORAYCA (registered trademark)" T800S-24K, "TORAYCA (registered trademark)" T700G-24K, "TORAYCA (registered trademark)" T700S-24K, "TORAYCA (registered trademark)" T300-3K, and "TORAYCA (registered trademark)" T1100G-24K (they are manufactured by Toray Industries, Inc.), and the like.

The form and arrangement of the reinforcing fibers can be appropriately selected from forms in which reinforcing fibers are arranged in one direction, laminates of a form in which reinforcing fibers are arranged in one direction, forms of a woven fabric, and the like. In order to obtain a laminate which is lightweight and has higher level durability, it is preferable that, in each prepreg, the reinforcing fibers are in the form of continuous fibers such as long fibers (fiber bundles) arranged in one direction or woven fabrics.

The reinforcing fiber bundle may be composed of a plurality of fibers in the same form, or may be composed of a plurality of fibers in the different forms. The number of the reinforcing fibers forming one reinforcing fiber bundle is usually 300 to 60,000, and is preferably 300 to 48,000, more preferably 1,000 to 24,000 in consideration of production of a base material. The range may be a combination of any of the upper limits and any of the lower limits, described above.

The structural component [A], the reinforcing fibers, having a strand tensile strength, measured in accordance with the resin-impregnated strand test method of JIS R7608 (2007), of 5.5 GPa or more is preferable, because in such a case a laminate having the excellent joining strength in addition to the tensile strength can be obtained. The strand tensile strength is more preferably 5.8 GPa. The joining strength as used herein refers to a tensile shear joining strength determined in accordance with ISO 4587: 1995 (JIS K6850 (1994)).

The prepreg of the present invention preferably has an amount of the reinforcing fibers per unit area of 30 to 2,000 $g/m^2$. When the amount of the reinforcing fibers is 30 $g/m^2$ or more, the number of layers can be reduced for obtaining a predetermined thickness in the molding of the laminate, and the operation tends to be simple. On the other hand, when the amount of the reinforcing fibers is 2,000 g/m² or less, the drapability of the prepreg is easily improved.

The mass content of the reinforcing fibers in the prepreg and the laminate of the present invention is preferably 30 to 90% by mass, more preferably 35 to 85% by mass, still more preferably 40 to 80% by mass. The range may be a combination of any of the upper limits and any of the lower limits, described above. When the mass content of the reinforcing fibers is 30% by mass or more, the amount of the resin is not excessively large relative to the amount of the fibers, and it is easy to obtain the advantage of the laminate having the excellent specific strength and specific elastic modulus, and a calorific value is hardly excessively increased at the time of curing during the molding from the prepreg to the laminate. When the mass content of the reinforcing fibers is 90% by mass or less, poor impregnation of the resin is unlikely to occur, and voids in the resulting laminate are likely to be reduced.

<Structural Component [B] Thermosetting Resin>

The thermosetting resin used as the structural component [B] may include, for example, unsaturated polyester resins, vinyl ester resins, epoxy resins, phenol resins, urea resins, melamine resins, polyimide resins, cyanate ester resins, bismaleimide resins, benzoxazine resins, copolymers or modified products thereof, and resins obtained by blending at least 2 kinds thereof. In order to improve the impact resistance, an elastomer or a rubber component may be added to the thermosetting resin. Of these, the epoxy resins are preferable because of their excellent mechanical characteristics, the heat resistance, and the adhesiveness to the reinforcing fibers. The main agent of the epoxy resin may include, for example, bisphenol type epoxy resins such as bisphenol A type epoxy resin, bisphenol F type epoxy resin, bisphenol AD type epoxy resin, and bisphenol S type epoxy resin, brominated epoxy resins such as tetrabromobisphenol A diglycidyl ether, epoxy resins having a biphenyl backbone, epoxy resins having a naphthalene backbone, epoxy resins having a dicyclopentadiene backbone, novolac type epoxy resins such as phenol novolac type epoxy resin and cresol novolac type epoxy resin, glycidyl amine type epoxy resins such as N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-methylenedianiline, N,N,N',N'-tetraglycidyl-2,2'-diethyl-4,4'-methylenedianiline, N,N,N',N'-tetraglycidyl-m-xylylenediamine, N,N-diglycidylaniline, and N,N-diglycidyl-o-toluidine, resorcidyl glycidyl ethers, triglycidyl isocyanurates, and the like.

The structural component [B] according to an embodiment of the present invention: The thermosetting resin preferably includes the epoxy resin, and an aspect in which the thermosetting resin includes a glycidyl amine type epoxy resin including 3 or more glycidyl groups in an amount of 40 to 100 parts by mass based on 100 parts by mass of the total epoxy resins included in the thermosetting resin is more preferable, because a cured product having a high heat resistance is obtained. The glycidyl amine type epoxy resin including 3 or more glycidyl groups may include N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-methylenedianiline, N,N,N',N'-tetraglycidyl-2,2'-diethyl-4,4'-methylenedianiline, N,N,N',N'-tetraglycidyl-m-xylylenediamine, and the like.

The curing agent for the epoxy resin may include, for example, dicyandiamides, aromatic amine compounds, phenol novolac resins, cresol novolac resins, polyphenol compounds, imidazole derivatives, tetramethylguanidine, thiourea-added amines, carboxylic acid hydrazides, carboxylic acid amides, polymercaptans, and the like.

In particular, when the aromatic amine curing agent is used as the curing agent for the epoxy resin, a cured product of the epoxy resin having the good heat resistance can be obtained. The aromatic amine compound may include, for example, 3,3'-diisopropyl-4,4'-diaminodiphenyl sulfone, 3,3'-di-t-butyl-4,4'-diaminodiphenyl sulfone, 3,3'-diethyl-5,5'-dimethyl-4,4'-diaminodiphenyl sulfone, 3,3'-diisopropyl-5,5'-dimethyl-4,4'-diaminodiphenyl sulfone, 3,3'-di-t-butyl-5,5'-dimethyl-4,4'-diaminodiphenyl sulfone, 3,3',5,5'-tetraethyl-4,4'-diaminodiphenyl sulfone, 3,3'-diisopropyl-5,5'-diethyl-4,4'-diaminodiphenyl sulfone, 3,3'-di-t-butyl-5,5'-diethyl-4,4'-diaminodiphenyl sulfone, 3,3',5,5'-tetraisopropyl-4,4'-diaminodiphenyl sulfone, 3,3'-di-t-butyl-5,5'-diisopropyl-4,4'-diaminodiphenyl sulfone, 3,3',5,5'-tetra-t-butyl-4,4'-diaminodiphenyl sulfone, 4,4'-diaminodiphenyl sulfone, 3,3'-diaminodiphenyl sulfone, and the like.

<Structural Component [E] Thermoplastic Resin Component>

A resin area including the thermosetting resin, the structural component [B], preferably includes a thermoplastic resin component (structural component [E]) soluble in the thermosetting resin, the structural component [B], in a dissolved state. Such a thermoplastic resin component is distinguished from the structural component [C] in that it is included in the resin area including the structural component [B]. When the structural component [E] is included, the affinity of the structural component [B] with the thermoplastic resin, the structural component [C], is improved, and the joining strength is also improved when the laminate is joined to the member through the structural component [C]. Here, "soluble in a thermosetting resin" refers to a state in which when a mixture of a thermoplastic resin component with a thermosetting resin is heated or stirred while heating, there is a temperature range in which the mixture is in a uniform phase. Here, "in a uniform phase" refers to a state in which separation is not observed visually. Here, the "dissolved state" refers to a state in which when the temperature of the thermosetting resin including the thermoplastic resin component is adjusted to a certain range, a uniform phase is formed. Once the uniform phase is formed in the certain temperature range, there is no problem even if the separation may occur at a temperature other than the temperature range, for example, at room temperature.

The thermoplastic resin of the structural component [E], is generally preferably a thermoplastic resin having a bond selected from the group consisting of a carbon-carbon bond, an amide bond, an imide bond, an ester bond, an ether bond, a carbonate bond, a urethane bond, a thioether bond, a sulfone bond, and a carbonyl bond in the main chain. In addition, the thermoplastic resin component may partially have a crosslinked structure, and may be crystalline or may be amorphous. In particular, it is preferably at least one resin selected from the group consisting of polyamide, polycarbonate, polyacetal, polyphenylene oxide, polyphenylene sulfide, polyarylate, polyester, polyamidoimide, polyimide, polyetherimide, polyimide having a phenyltrimethylindane structure, polysulfone, polyethersulfone, polyetherketone, polyetheretherketone, polyaramid, polyvinyl formal, polyvinyl butyral, phenoxy resin, polyethernitrile, and polybenzimidazole. In order to obtain the good heat resistance, it is preferable that the glass transition temperature is 150° C. or higher, more preferably 170° C. or higher, from the point of view in which it is difficult to cause the thermal deformation when used as a molding, and the polyetherimide and the polyethersulfone are preferable examples.

In terms of the improvement of joining strength, it is preferable that the structural component [E] is included in an amount of 3 parts by mass or more and 30 parts by mass or less based on 100 parts by mass of the structural component [B].

<Structural Component [C], Thermoplastic Resin>

It is important that the thermoplastic resin, the structural component [C], according to an embodiment of the present invention is a crystalline resin having a glass transition temperature of 100° C. or higher, or amorphous resin having a glass transition temperature of 180° C. or higher. The crystalline thermoplastic resin having a glass transition temperature of 100° C. or higher may include, for example, polyarylene ether ketone such as polyketone, polyether ether ketone, polyether ether ketone, and polyether ketone ketone, alicyclic polyamides, semi-aromatic polyamides, modified polyphenylene sulfide, and the like. The amorphous thermoplastic resin having a glass transition temperature of 180° C. or higher may include, for example, polyetherimide, polyethersulfone, polysulfone, modified polysulfone, polyamideimide, and the like. In addition, the thermoplastic resins may be copolymers or modified products of the resin described above, and/or blended resins of two or more kinds thereof. The glass transition temperature can be measured by using a differential scanning calorimeter (DSC) based on JIS K7121 (2012). The upper limit of the glass transition temperature is not particularly limited, and is 400° C. in normal thermoplastic resins.

Of these, the polyarylene ether ketone and the polyetherimide are preferable in terms of the heat resistance. The polyarylene ether ketone having a melting point of 200° C. to 340° C. is more preferable.

In order to improve the impact resistance, an elastomer or a rubber component may be added to the structural component [C]. Furthermore, other fillers and additives may be appropriately included depending on the use, and the like, as long as the object of the present invention is not impaired. They may include, for example, inorganic fillers, flame retardants, conductivity imparting agents, crystal nucleating agents, ultraviolet absorbers, antioxidants, damping agents, antibacterial agents, insect repellents, deodorants, coloring inhibitors, heat stabilizers, mold release agents, antistatic agents, plasticizers, lubricants, coloring agents, pigments, dyes, foaming agents, antifoaming agents, coupling agents, and the like.

In the prepreg of the present invention, it is preferable that the structural component [C], the thermoplastic resin, has a basis weight of 10 g/m$^2$ or more. The basis weight is preferably 10 g/m$^2$ or more, because a sufficient thickness for exhibiting the excellent joining strength can be obtained. The basis weight is more preferably 20 g/m$^2$. The upper limit is not particularly limited, and is preferably 500 g/m$^2$ or less, because the amount of the thermoplastic resin is not excessively large as compared to the amount of the reinforcing fibers, and a laminate having the excellent specific strength and specific elastic modulus can be obtained. Here, the basis weight refers to a mass (g) of the structural component [C] included per m$^2$ of the prepreg.

<Structural component [D] Cured Product of Thermosetting Resin>

The cured product of the thermosetting resin, the structural component [D], in the present invention, can be obtained by thermally curing the thermosetting resin [B].

Temperature conditions for the thermal curing can be appropriately set according to the type of the thermosetting resin, and the type and amount of the curing agent and accelerator; for example, when an epoxy resin is included as the thermosetting resin and diaminodiphenyl sulfone is used as the amine compound, a temperature condition of 180° C. for 2 hours can be preferably used, and when dicyandiamide is used as the curing agent, a temperature condition of 135° C. for 2 hours can be preferably used.

The curing of the structural component [D] included in the laminate can be determined in a manner in which when the laminate is subjected to a differential scanning calorimetry at a temperature-rising rate of 10° C./min in an inert gas atmosphere, if an area of a peak appearing as an exothermic reaction (residual heat generation) is 50 J/g or less, it can be determined that the laminate is substantially a cured product. Alternatively, when the thermosetting resin composition before curing can be specified, the degree of cure is obtained by using the following formula, and if it is 90% or more, it may be determined that the resulting laminate is the cured product.

Degree of cure (%)=((a calorific value of the composition including the thermosetting resin before curing)−(a calorific value of the cured product of the thermosetting resin))/(a calorific value of the composition including the thermosetting resin before curing)×100.

In the formula described above, each calorific value is a value obtained by calculating as an area of a peak appearing as an exothermic reaction when a thermosetting resin composition including a thermosetting resin in the structural component [D] and a curing agent specified before curing, or a cured product of the thermosetting resin is subjected to a differential scanning calorimetry at a temperature-raising rate of 10° C./min in an inert gas atmosphere. Apart from the structural component [D] included in the laminate, resins having the same structure as those in the thermosetting resin and the resin specified as the curing agent are prepared, and they may be subjected to the measurement. Here, when the curing agent cannot be specified, 4,4'-diaminodiphenyl sulfone may be used as the curing agent in the composition. In addition, compounds described below in Examples such as a curing catalyst and a viscosity modifier can be preferably used as a component capable of forming the composition, and they are not particularly limited as long as they do not affect the measurement results.

<Prepreg>

In the prepreg according to an embodiment of the present invention, the reinforcing fibers [A] are present included in the resin area including [B] and the resin area including [C] across the interface between the two resin areas. The state in which it is included in the two resin areas across the interface between the two resin resins is explained with reference to FIG. 2. In the observation image 9 in FIG. 2, the resin area 7 including the structural component [C] closely adheres to the resin area 8 including the structural component [B], and is shown as an interface 10 in the observation image 9. In addition, a plurality of the structural components [A] 6 are present on the interface 10. The state in which the structural component [C] and the structural component [B] are brought into contact with each other around the reinforcing fibers, as described above, can be said as a state in which the reinforcing fibers are "included in the two resin areas across the interface".

When the reinforcing fibers [A] are present included in the two resin areas across the interface, the strength of the resin area including the structural component [C] is improved, and the joining strength is improved. The structural component [A] present on the interface is chemically and/or physically bonded to the structural component [B] and to the structural component [C], whereby the adhesive force between the resin area including the structural component [B] and the resin area including the structural component [C] is improved. It is enough that the number of the fibers in the structural component [A] present on the interface is 1 or more, and though the upper limit of the number is not particularly limited, it is 200 in an observation range described below.

For the prepreg of the present invention, when the prepreg is viewed in planar view, it is possible to simultaneously evaluate the adhesive forces in a fiber axis direction and a direction perpendicular to the fiber axis direction by observing an adhesion mode of the resin areas at the interface in a cross-section perpendicular to a plane of the prepreg including the fiber [A], from a direction at an angle different by 45 degrees, either clockwise or counterclockwise, to the direction of any fiber [A] included in the two resin areas, that is, in a cross-section obtained by cutting the prepreg perpendicularly to the plane direction of the prepreg.

In the prepreg of the present invention, it is preferable that the cross-sectional curve, formed by the interface at which the two resin areas closely adhere to each other, has an average roughness length RSm, defined in JIS B0601 (2001), of 100 µm or less, and an average roughness height Rc of 3.5 µm or more.

In such a cross-sectional observation, when the cross-sectional curve, formed by the interface, has an average roughness length RSm, defined in accordance with JIS B0601 (2001), of 100 µm or less, it is less likely to be peeled off the resin area including the structural component [B] and the resin area including the structural component [C] from each other due to not only a chemical and/or physical bonding force but also a mechanical bonding force of interpenetration. The lower limit thereof is not particularly limited, and is preferably 15 µm or more for avoiding decrease in the mechanical bonding force due to stress concentration. When the cross-sectional curve has an average roughness height Rc of 3.5 µm or more, not only the mechanical bonding force is exhibited by the interpenetration but also the structural component [A], present on the interface, is chemically and/or physically bonded to the structural component [B] and the structural component [C], whereby the adhesive force between the resin area including the structural component [B] and the resin area including the structural component [C] is improved. When Rc satisfies the range described above, it is easy to obtain the reinforcing fibers [A] included in the resin area including [B] and the resin area including [C] across the interface between the two resin areas.

The average roughness height Rc of the cross-sectional curve is preferably 10 µm or more, in which the structural component [A] is easily included in the two resin areas and thus the adhesive force is further improved, particularly preferably 20 µm or more. The upper limit is not particularly limited, and is preferably 100 µm or less for avoiding decrease in the mechanical bonding force due to stress concentration.

Here, known methods can be used for measuring the average roughness height Rc and the average roughness length RSm of the cross-sectional curve. Examples thereof may include a method in which after the structural component [B] is cured, measurement is performed from a cross-sectional image obtained using an X-ray CT, a method in which measurement is performed from an elemental analysis mapping image by using an energy dispersive X-ray spectrometer (EDS), and a method in which measurement is preformed from a cross-sectional observation image by using an optical microscope, a scanning electron microscope (SEM), or a transmission electron microscope (TEM). In the observation, the structural component [B] and/or the structural component [C] may be dyed in order to adjust the contrasts. In the image obtained by any of the methods described above, the average roughness height Rc and the average roughness length RSm of the cross-sectional curve are measured in a range of 500 µm×500 µm.

Figure 2:
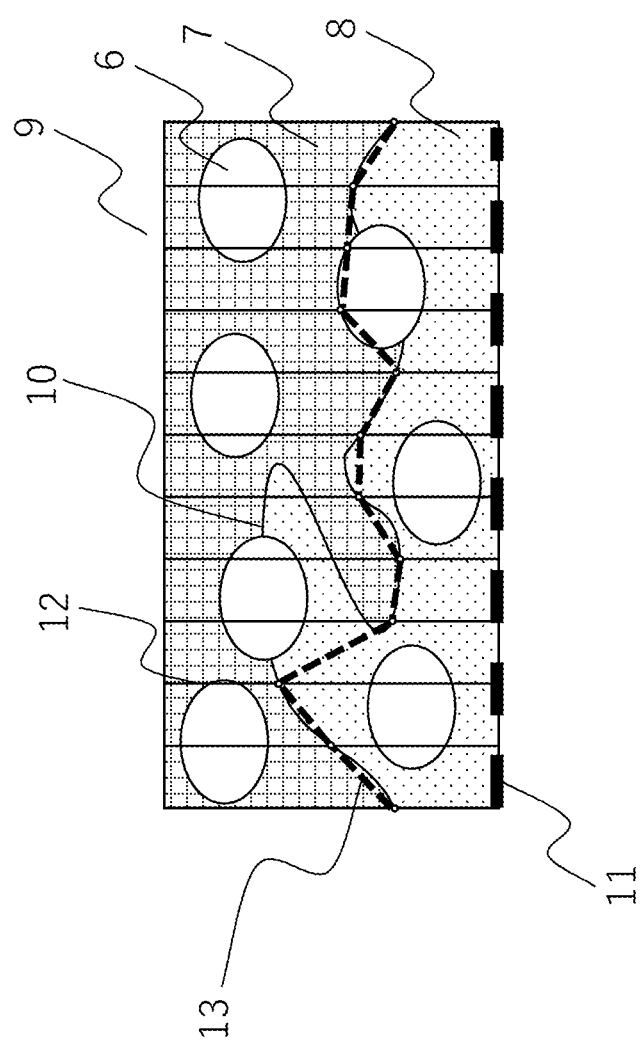
FIG. 2 is a schematic view showing a cross-section perpendicular to a prepreg plane or a laminate plane in an embodiment of the present invention, and helps to explain a method for measuring an average roughness length RSm and an average roughness height Rc.

An example of a method for measuring the average roughness height Rc and the average roughness length RSm of the cross-sectional curve is shown with reference to FIG. 2. In the observation image 9 shown in FIG. 2, the resin area 7 including the structural component [C] closely adheres to the resin area 8 including the structural component [B], and is illustrated as the interface 10 in the observation image 9. In addition, a plurality of the structural components [A] 6 are present on the interface 10.

One example of the method for measuring the average roughness height Rc or the average roughness length RSm of the cross-sectional curve (a method 1 for measuring a cross-sectional curve element) is shown. Perpendicular baselines 12 are drawn at an interval of 5 µm from the resin area 8 including the structural component [B] toward the resin area 7 including the structural component [C], the end 11 on the resin area including the structural component [B] in the rectangular observation image 9 being defined as a baseline. Points at which the perpendicular baseline drawn from the baseline intersects the structural component [C] for the first time are plotted, and a line connecting the plotted points is defined as a cross-sectional curve 13. The obtained cross-sectional curve 13 is subjected to a filtering processing in accordance with JIS B0601 (2001), and the average roughness height Rc and the average roughness length RSm of the cross-sectional curve 13 are calculated.

In the prepreg of the present invention, it is preferable that the resin area including [B] and the resin area including [C] are adjacent to each other in a layered state to form the interface, because the excellent mechanical characteristics can be exhibited.

<Laminate>
<Laminate (Part 1)>

In the laminate (Part 1) according to embodiments of the present invention, the prepreg of the present invention forms at least a part of the layers in the state of a cured product. It is preferable that there is the structural component [C], the thermoplastic resin, on the surface or between the layers. The presence of the structural component [C], the thermoplastic resin, present on the surface of the laminate makes it possible to join the laminate according to an embodiment of the present invention to the same or different kind of member through the structural component [C] by welding. On the other hand, when the structural component [C], the thermoplastic resin, is present between layers of the laminate, an excellent interlaminar fractural toughness values ($G_{IC}$ and $G_{IIC}$) can be obtained. It is more preferable that there are the structural components [C] both on the surface and between the layers.

The laminate (Part 1) of the present invention can be produced by a method in which the prepregs of the present invention described above are laminated alone or together with other prepregs, and the resulting product is cured by pressurization and heating. Here, as the method for applying heat and pressure, for example, a press molding method, an autoclave molding method, a bagging molding method, a wrapping tape method, an internal pressure molding method, or the like, is adopted.

<Laminate (Part 2)>

The laminate (Part 2) according to an embodiment of the present invention includes a layer including the following structural components [A], [C], and [D]:
[A] reinforcing fibers;
[C] a thermoplastic resin; and
[D] a cured product of a thermosetting resin.

In the laminate (Part 2) according to an embodiment of the present invention, the reinforcing fibers [A] are present which are included in the resin area including [C] and the resin area including [D] across the interface between the two resin areas. The detailed descriptions are the same as those in the prepreg of the present invention except that the structural component [B] is replaced with the structural component [D].

In the laminate (Part 2) according to an embodiment of the present invention, when the laminate is viewed in planar view, in a cross-section perpendicular to a plane of the laminate including the fibers [A], present across the interface between the two resin areas, from a direction of an angle different by 45 degrees, either clockwise or counterclockwise, to the direction of any fiber [A] included in the two resin areas, that is, in a cross-section obtained by cutting the laminate perpendicularly to the laminate plane direction, or the like, it is preferable that the cross-sectional curve, formed by the interface at which the two resin areas closely adhere to each other, has an average roughness length RSm, defined in accordance with JIS B0601 (2001), of 100 µm or less, and an average roughness height Rc of 3.5 µm or more. The detailed descriptions are the same as those in the prepreg of the present invention except that the structural component [B] is replaced with the structural component [D].

It is preferable in the laminate (Part 2) of the present invention that the resin area including [C] and the resin area including [D] are adjacent to each other in a layered state to form the interface, because the excellent mechanical characteristics can be exhibited.

In the laminate (Part 2) of the present invention, it is preferable that there is the structural component [C], the thermoplastic resin, on the surface thereof or between the layers. The presence of the structural component [C], thermoplastic resin, present on the surface of the laminate makes it possible to join the laminate of the present invention to the same or different kind of member through the structural component [C] by welding. On the other hand, when there is a material including the structural component [C], thermoplastic resin, between layers of the laminate, the excellent interlaminar fractural toughness values ($G_{IC}$ and $G_{IIC}$) are obtained. It is more preferable that there are the structural components [C] both on the surface and between the layers.

The method for molding the laminate (Part 2) of the present invention may include, for example, molding methods such as a press molding method, an autoclave molding method, a bagging molding method, a wrapping tape method, an internal pressure molding method, a hand lay-up method, a filament winding method, a pultrusion method, a resin injection molding method, and a resin transfer molding method.

<Molding>

The laminate of the present invention can be integrated (welded) with another member, i.e., a member (adherend), which is the same and/or different kind of member forming the laminate, through the structural component [C] present on the surface of the laminate, by joining the member to the structural component [C] by some kind of heating methods. The different kind of member (adherend) may include members including a thermoplastic resin and members including a metal material. The integration method is not particularly limited, and may include, for example, thermal welding, vibration welding, ultrasonic welding, laser welding, resistance welding, induction welding, insert injection molding, outsert injection molding, and the like.

The strength of the joint in the integrated member can be evaluated based on ISO 4587: 1995 (JIS K 6850 (1994)). The tensile shear joining strength, measured based on ISO 4587: 1995, is preferably 25 MPa or more at a test environment temperature of 23° C., more preferably 28 MPa or more. In general, a laminate having a tensile shear joining strength of 20 MPa or more can be utilized for joining structural materials, and such a tensile shear joining strength value is higher than that (about 10 MPa) of an adhesive generally used at a test environment temperature of 23° C. In applications requiring the mechanical characteristics in a high temperature and high humidity environment, it is preferable that the tensile shear joining strength is 13 MPa or more at a test environment temperature of 80° C. after the water absorption, in an evaluation based on ISO 4587: 1995, more preferably 16 MPa or more. The better the member, the higher the tensile shear joining strength; the upper limit thereof is not particularly limited, and in integrated moldings of laminates generally used, the upper limit of the tensile shear joining strength is 200 MPa at a test environment temperature of 23° C. or 80° C. after the water absorption.

Furthermore, the fatigue joining strength of the joint in the integrated member can be evaluated based on JASO M353 (1998). When the test environment temperature is 23° C., the fatigue joining strength is preferably 11 MPa or more, more preferably 13 MPa or more. The more preferable the member, the higher the fatigue joining strength; the upper limit thereof is not particularly limited, and in integrated moldings of laminates generally used, the upper limit of the fatigue joining strength is 100 MPa.

The laminate and the integrated molding of the present invention are preferably used in aircraft structural members, wind turbine blades, automobile external plates, computer applications such as IC trays and housings of laptop computers, and sports applications such as golf shafts and tennis rackets.

EXAMPLES

Hereinafter, the present invention will be described in more detail with reference to Examples. However, the scope of the present invention is not limited to these Examples. The unit "part" of the composition ratio refers to part by mass unless otherwise noted. In addition, measurements of various characteristics were performed under an environment in which a temperature was 23° C. and a relative humidity was 50% unless otherwise noted.

<Evaluation and Measurement Method>

(1) Glass Transition Temperature and Melting Point of Thermoplastic Resin

The glass transition temperature and the melting point of the thermoplastic resin were measured using a differential scanning calorimeter (DSC) based on JIS K7121 (2012).

(2) Tensile Shear Joining Strength

A laminate, which was an embodiment of the present invention, or a comparative product thereof were cut into 2 sheets having a width of 250 mm and a length of 92.5 mm, wherein the 0° direction was defined as the length direction of the test piece, and dried them in a vacuum oven for 24 hours. Thereafter, 2 cut panels having sizes of a width of 250 mm and a length of 92.5 mm, were overlaid on each other, with a width of 25 mm×a length of 12.5 mm in which the 0° direction was the length direction, a pressure of 3 MPa was applied thereto at a temperature 20° C. higher than the melting point of the thermoplastic resin, the structural component [C] used, and it was held for 1 minute to weld the overlaid surfaces, whereby an integrated molding was obtained. A tab was bonded to the obtained integrated molding in accordance with ISO 4587: 1995 (JIS K6850 (1994)), and it was cut into a piece having a width of 25 mm to obtain a desired test piece.

The obtained test piece was dried in a vacuum oven for 24 hours, and the tensile shear joining strength was evaluated at an environmental temperature of 23° C. based on ISO 4587: 1995 (JIS K6850 (1994)). The tensile shear joining strength in an environment at 80° C. after the water absorption was evaluated as follows: the obtained test piece was immersed in warm water at 70° C. for 2 weeks, and the resulting piece was evaluated based on ISO 4587: 1995 (JIS K6850 (1994)) at an environmental temperature of 80° C. Evaluation was made as described below based on the measurement results.

(a) Tensile Shear Joining Strength at 23° C.
28 MPa or more: A
25 MPa or more and less than 28 MPa: B
20 MPa or more and less than 25 MPa: C
Less than 20 MPa: D (failed).

(b) Tensile Shear Joining Strength at 80° C. after Water Absorption
16 MPa or more: A
13 MPa or more and less than 16 MPa: B
10 MPa or more and less than 13 MPa: C
Less than 10 MPa: D (failed).

(4) Fatigue Joining Strength

A test piece was prepared in the same procedures as in the method (1) for measuring the tensile shear joining strength, and the test was performed by using a fatigue tester. With reference to JASO M353 (1998), a test was performed at an environmental temperature of 23° C. in conditions of a distance between chucks of 100 mm, a sinusoidal stress waveform, a stress ratio R=0.1, and a frequency of 10 Hz.

The maximum stress of the stress waveform breaking at the $10^3$ time was defined as the fatigue joining strength. Evaluation was made as described below based on the measurement results.
13 MPa or more: A
11 MPa or more and less than 13 MPa: B
9 MPa or more and less than 11 MPa: C
Less than 9 MPa: D (failed).

(5) Interlaminar Fractural Toughness Value ($G_{IC}$ and $G_{IIC}$)

A prepregs [I], described below, or a comparative product thereof was cut into a predetermined size, and 20, in total, prepregs [I] or the comparative products thereof were laminated in the same reinforcing fiber direction. At that time, a release film for introducing preliminary cracks was put between the 10th sheet and the 11th sheet, which were placed at the center, to prepare a preform. This preform was set in a press molding die, a pressure of 0.6 MPa was applied using a press machine while maintaining this shape using a jig or a spacer as necessary, and the preform was heated at 180° C. for 2 hours to obtain a laminate. This laminate may correspond to an embodiment of the laminate of the present invention or a comparative product thereof, but may also be said to be a laminate for evaluation of the interlaminar fractural toughness value in that a release film for introduction of the preliminary cracks is put between the layers.

The laminate for the evaluation, described above, was cut into a rectangular test piece having a length of 150 mm and a width of 20 mm, in which the reinforcing fiber axis was the length direction of the test piece, and it was dried in a vacuum oven at 60° C. for 24 hours. The obtained test piece was evaluated for interlaminar fractural toughness values ($G_{IC}$ and $G_{IIC}$) in an environment at 23° C. in accordance with JIS K7086 (1993).

(6) Average Roughness Length RSm and Average Roughness Height Rc of Prepreg or Laminate Using a prepared prepreg [I] or laminate produced, an image at a magnification of 1000 was photographed using an optical microscope in a cross-section, obtained by cutting perpendicularly to a plane direction of the prepreg at an angle of 45 degrees in a planar view of the prepreg with respect to any fiber direction of [A] included in the two resin areas. In an arbitrary observation range of 500 μm×500 μm in the obtained image, the average roughness length RSm and the average roughness height Rc, defined in JIS B0601 (2001), of the cross-sectional curve element obtained by the measurement method 1 of the cross-sectional curve element, were measured.

<Materials Used in Examples and Comparative Examples>

The following structural components [A], [B], [C], and [E] were used. The structural components used in each of Examples and Comparative Examples are as shown in Tables 1 and 2.

(1) Structural Component [A]: Reinforcing fibers
T800: Carbon fiber ("TORAYCA (registered trademark)" T800S-24 K, manufactured by Toray Industries, Inc., strand tensile strength: 5.9 GPa)
T1100: Carbon fiber ("TORAYCA (registered trademark)" T1100G-24 K, manufactured by Toray Industries, Inc., strand tensile strength: 7.0 GPa)
T700: Carbon fiber ("TORAYCA (registered trademark)" T700S-24 K, manufactured by Toray Industries, Inc., strand tensile strength: 4.9 GPa).

(2) Structural Component [C]: Thermoplastic Resin
PEKK: Film including polyether ketone ketone ("KEPSTAN" (registered trademark) 7002 (manufactured by Arkema Com., crystalline, melting point: 331° C., glass transition temperature: 162° C.)), and having a basis weight of 120 g/m²
PEEK: Film including polyether ether ketone (PEEK 450G (manufactured by Victrex plc, crystalline, melting point: 343° C., glass transition temperature: 143° C.)), and having a basis weight of 120 g/m²
Semi-aromatic PA: Film including polyamide 6T (crystalline, melting point: 320° C., glass transition temperature: 125° C.) and having a basis weight of 120 g/m²
PEI: Film including polyetherimide ("ULTEM" (registered trademark) 1010 manufactured by SABIC, amorphous, glass transition temperature: 217° C.) and having a basis weight of 120 g/m²
PA6: Film including polyamide 6 ("Amilan" (registered trademark) CM 1007 (manufactured by Toray Industries, Inc., crystalline, melting point: 225° C., a glass transition temperature: 48° C.)), and having a basis weight of 120 g/m².

(3) Structural component [B]: Thermosetting resin
A thermosetting resin composition of each specific example described in Table 1 was prepared using the following compounds.
(3-1) Thermosetting Resin (Epoxy Resin)
Tetraglycidyl diaminodiphenylmethane ("Araldite" (registered trademark) MY721, manufactured by Huntsman Advanced Materials LLC.), epoxy equivalent: 113 (g/eq.), tetrafunctional glycidyl amine type epoxy resin)

Bisphenol A type epoxy resin ("jER" (registered trademark) 825, manufactured by Mitsubishi Chemical Corporation, epoxy equivalent: 175 (g/eq.)).

(3-2) Curing Agent 4,4'-Diaminodiphenyl sulfone (SEIKACURE S, manufactured by Wakayama Seika Kogyo Co., Ltd.).

(4) Structural Component [E]: Thermoplastic Resin Soluble in Thermosetting Resin Polyetherimide ("ULTEM" (registered trademark) 1010 manufactured by SABIC).

(5) Method for Preparing Thermosetting Resin Composition

B-1: Into kneading apparatus were put 50 parts by mass of Araldite MY721, 50 parts by mass of jER825, and 7.6 parts by mass of polyetherimide, and heated and kneaded to dissolve the polyetherimide. Then, the temperature was lowered to 100° C. or lower while continuing the kneading, 45.1 parts by mass of 4,4'-diaminodiphenyl sulfone was added thereto, and the mixture was stirred to obtain a thermosetting resin composition.

B-2: A thermosetting resin composition was prepared in the same blending amount in the same manner as in B-1 except that polyetherimide was not blended.

<Production of Prepreg>

The prepreg was prepared by the following 2 methods. The structural components used in each Example were as described in Tables 1 and 2.

Prepreg [I]

While the structural component [A], the reinforcing fibers (basis weight: 193 g/m$^2$), was drawn out as a reinforcing fiber sheet in a continuous state in which the fibers were aligned in one direction and the sheet was run in one direction, a resin sheet including the structural component [C] and having a basis weight of 120 g/m$^2$ was put on the continuous reinforcing fiber sheet, and the structural component [C] was melted by heating it with an IR heater to attach it to the entire one surface of the continuous reinforcing fiber sheet, and pressure was applied to the resulting sheet with nip rolls having a surface temperature maintained to be equal to or lower than the melting point of the structural component [C] to cool the reinforcing fiber sheet impregnated, whereby a fiber-reinforced resin intermediate. The thermosetting resin composition, the structural component [B], selected as described in Tables 1 and 2, was coated on a release paper in a resin basis weight of 100 g/m$^2$ using a knife coater to produce a thermosetting resin film, and then the thermosetting resin film was overlaid on a surface opposite to the surface impregnated with the structural component [C] in the intermediate, and the resulting film was heated and pressurized by using heat rolls to impregnate the intermediate with the thermosetting resin composition, whereby a prepreg [I] was obtained. This prepreg [I] may correspond to an embodiment of the prepreg of the present invention or a comparative product thereof.

Prepreg [II]

Prepreg [II], as a precursor of the laminate, was produced combining with the prepreg [I] as follows: The thermosetting resin composition, the structural component [B], selected as described in Tables 1 and 2, was coated on a release paper in a resin basis weight of 50 g/m$^2$ using a knife coater to produce a resin film. The resin film was overlaid on both sides of the reinforcing fibers (basis weight: 193 g/m$^2$), the structural component [A], aligned in one direction, and the resulting film was heated and pressurized by using heat rolls to impregnate the carbon fibers with the thermosetting resin composition, whereby a prepreg [II] was obtained.

<Production of Laminate>

The prepregs [I] and [II], produced above, were cut into predetermined sizes to obtain 2 prepregs [I] and 6 prepregs [II]. The prepregs were laminated at [0°/90°]$_{2s}$ wherein an axial direction of the reinforcing fiber was defined as 0°, a direction orthogonal to the axial direction was defined as 90°, and the symbol s indicates mirror symmetry, to produce a preform. At that time, the lamination was performed so that the two outermost layers on both sides were the prepreg [I], and the thermoplastic resin layers including the structural component [C] were disposed on both surface layers of the preform. This preform was set in a press molding die, a pressure of 0.6 MPa was applied using a press machine while maintaining this shape using a jig or a spacer as necessary, and the preform was heated at 180° C. for 2 hours to obtain a laminate. This laminate may correspond to an embodiment of the laminate of the present invention or a comparative product thereof.

Example 1

In Example 1, the structural components were selected as described in Table 1, prepregs [I] and [II] were produced according to the <Production of Prepreg> described above, a laminate of the present invention was produced according to the <Production of Laminate> described above, and the tensile shear joining strength and the fatigue joining strength were evaluated.

Comparative Example 1

In Comparative Example 1, prepregs [I] and [II] and a laminate were produced in the same manner as in Example 1 except that PA6 was used as the thermoplastic resin, as described in Table 2, and the tensile shear joining strength and the fatigue joining strength were evaluated.

In Example 1, it was shown that the laminate had the more excellent tensile joining strength at 80° C. after the water absorption and the more excellent fatigue joining strength by using the polyetherketoneketone as the structural component [C], as compared with Comparative Example 1 (the glass transition temperature of the thermoplastic resin was 100° C. or lower).

Example 2

As described in Table 1, the same procedure as in Example 1 was carried out, except that the polyetherimide was not added as the thermoplastic resin soluble in a thermosetting resin, to prepare prepregs [I] and [II] and a laminate of Example 2, and the tensile shear joining strength and the fatigue joining strength were evaluated.

In Example 1, by including the polyetherimide as the thermoplastic resin soluble in the thermosetting resin, preferable tendencies were shown, i.e., the tensile shear joining strength and the fatigue joining strength at 23° C. and 80° C. after the water absorption were more improved as compared with Example 2 in which no polyetherimide was included.

Examples 3 and 4

As described in Table 1, in Examples 3 and 4, reinforcing fibers having different strand tensile strengths were used.

Comparing Examples 1, 3 and 4, the tensile shear joining strength at 23° C. and 80° C. after the water absorption and the fatigue joining strength were more improved as the strand tensile strengths became higher, and preferable characteristics were exhibited.

Comparative Example 2

In Comparative Example 2, a film of polyamide 6 ("AMILAN" (registered trademark) CM 1007 (manufactured by Toray Industries, Inc.)) having a film basis weight of 50 g/m² was attached to both surfaces of a reinforcing fiber sheet arranged in a planar manner in one direction, without producing prepregs by <Production of Prepreg> described above, and the resulting laminate was heated and pressurized at 250° C. to obtain a prepreg having a reinforcing carbon fiber with a basis weight of 193 g/m². The obtained prepreg was cut into a predetermined size, laminated was performed in a [0°/90°]$_{2s}$ configuration, and then the resulting product was heated at 250° C. for 10 minutes under a pressure of 3 MPa using a press machine to obtain a laminate.

The tensile joining strength and the fatigue joining strength of the obtained laminate were measured by the method described in Examples. As shown in Table 2, because the polyamide 6 was used as the thermoplastic resin, and further no thermosetting resin was included, the tensile shear joining strength and the fatigue joining strength at 80° C. after the water absorption were lower than those in Example 1, and only insufficient properties as a structural material were exhibited.

Examples 5 to 7

As shown in Table 1, in Examples 5 to 7, the structural component [C] different from that in Example 1 was used, but the excellent various joining strengths were exhibited as in Example 1.

Example 8 and Comparative Examples 3 and 4

In Example 8, the prepreg [I] was cut into a predetermined size, and 20, in total, prepregs were laminated so as to have the same reinforcing fiber direction, and a release film for introducing preliminary cracks was put between the 10th sheet and the 11th sheet, which were placed at the center, to produce a preform.

In Comparative Example 3, a prepreg [II] (including no structural component [C]) was cut into a predetermined size, and the lamination and the insertion of the release film were performed in the same manner as in Example 5 to obtain a preform.

In Comparative Example 4, polyamide particles (SP-500, manufactured by Toray Industries, Inc.) were uniformly dispersed on one surface of a prepreg [II], cut into a predetermined size, in an amount of the particles per unit area of the prepreg was 7 g/m², and then the lamination and the insertion of the release film were performed in the same manner as in Example 8 to obtain a preform.

These preforms were pressurized and heated by the procedures described above to obtain a laminate for evaluation of the interlaminar fractural toughness value. For the obtained laminate for evaluation, the interlaminar fractural toughness values ($G_{IC}$ and $G_{IIC}$) were evaluated by the method described above. As shown in Tables 1 and 2, in Example 8 in which the structural component [C] was included between layers of the laminate, the excellent interlaminar fractural toughness values were shown as compared with Comparative Example 3 in which no structural component [C] was included and Comparative Example 4 in which the thermoplastic resin was included as a different form.

In the prepregs and the laminates of all Examples, it was confirmed that the reinforcing fibers [A] were included in the resin area including [B] and the resin area including [C] across the interface between the two resin areas, or included in the resin area including [C] and the resin area including [D] across the interface between the two resin areas. In Comparative Example 4, the reinforcing fibers [A] were not included in the resin area including [C].

TABLE 1-1

|  |  | Example 1 | Example 2 | Example 3 | Example 4 |
|---|---|---|---|---|---|
| Structural component [A]: Reinforcing fibers | | T800 | T800 | T1100 | T700 |
| Thermosetting resin composition | | B-1 | B-2 | B-1 | B-1 |
| Structural Component [C]: Thermoplastic Resin | | PEKK | PEKK | PEKK | PEKK |
| Characteristics of reinforcing fiber | Tensile strength (GPa) | 5.9 | 5.9 | 7.0 | 4.9 |
| Characteristics of thermoplastic resin. | Glass transition temperature (° C.) | 162 | 162 | 162 | 162 |
| Average roughness length RSm (μm) of prepreg | | 52 | 54 | 61 | 49 |
| Average roughness height Rc (μm) of prepreg | | 21 | 18 | 19 | 23 |
| Position of structural component [C] | | Surface | Surface | Surface | Surface |
| Characteristics of Laminate | Tensile shear joining strength at 23° C. (MPa) | A<br>29.2 | B<br>27.6 | A<br>30.8 | B<br>25.6 |
| | Tensile shear joining strength at 80° C. after water absorption (MPa) | A<br>21.2 | A<br>18.8 | A<br>22.3 | A<br>18.5 |
| | Fatigue joining strength (MPa) | A<br>13.5 | B<br>12.1 | A<br>14.7 | B<br>11.8 |
| | Interlaminar fractural toughness $G_{IC}$ (KJ/m²) | — | — | — | — |
| | Interlaminar fractural toughness $G_{IIC}$ (KJ/m²) | — | — | — | — |

TABLE 1-2

|  |  | Example 5 | Example 6 | Example 7 | Example 8 |
|---|---|---|---|---|---|
| Structural component [A]: Reinforcing fibers | | T800 | T800 | T800 | T800 |
| Thermosetting resin composition | | B-1 | B-1 | B-1 | B-1 |
| Structural Component [C]: Thermoplastic Resin | | PEEK | Semi-aromatic PA | PEI | PEKK |
| Characteristics of reinforcing fiber | Tensile strength (GPa) | 5.9 | 5.9 | 5.9 | 5.9 |
| Characteristics of thermoplastic resin. | Glass transition temperature (° C.) | 143 | 125 | 217 | 162 |
| Average roughness length RSm (μm) of prepreg | | 49 | 50 | 54 | 52 |
| Average roughness height Rc (μm) of prepreg | | 20 | 21 | 20 | 21 |
| Position of structural component [C] | | Surface | Surface | Surface | interlayer |
| Characteristics of Laminate | Tensile shear joining strength at 23° C. (MPa) | A 28.8 | A 29.1 | A 28.8 | |
| | Tensile shear joining strength at 80° C. after water absorption (MPa) | A 20.1 | A 19.5 | A 20.3 | |
| | Fatigue joining strength (MPa) | A 13.1 | A 13.3 | B 12.8 | |
| | Interlaminar fractural toughness $G_{IC}$ (KJ/m$^2$) | — | — | — | 2.1 |
| | Interlaminar fractural toughness $G_{IIC}$ (KJ/m$^2$) | — | — | — | 4.0 |

TABLE 2

|  |  | Comparative Example 1 | Comparative Example 2 | Comparative Example 3 | Comparative Example 4 |
|---|---|---|---|---|---|
| Structural component [A]: Reinforcing fibers | | T800 | T800 | T800 | T800 |
| Thermosetting resin composition | | B-1 | — | B-1 | B-1 |
| Structural Component [C]: Thermoplastic Resin | | PA6 | PA6 | — | PA6 particles |
| Characteristics of reinforcing fiber | Tensile strength (GPa) | 5.9 | 5.9 | 5.9 | 5.9 |
| Characteristics of thermoplastic resin. | Glass transition temperature (° C.) | 48 | 48 | — | — |
| Average roughness length RSm (μm) of prepreg | | 45 | — | — | — |
| Average roughness height Rc (μm) of prepreg | | 22 | — | — | — |
| Position of structural component [C] | | Surface | Surface | — | interlayer |
| Characteristics of Laminate | Tensile shear joining strength at 23° C. (MPa) | A 29.2 | A 28.7 | | |
| | Tensile shear joining strength at 80° C. after water absorption (MPa) | D 9.4 | D 8.2 | | |
| | Fatigue joining strength (MPa) | B 12.3 | C 10.4 | | |
| | Interlaminar fractural toughness $G_{IC}$ (KJ/m$^2$) | — | — | 0.5 | 0.7 |
| | Interlaminar fractural toughness $G_{IIC}$ (KJ/m$^2$) | — | — | 0.8 | 2.4 |

DESCRIPTION OF REFERENCE SIGNS

1: Prepreg or laminate
2: Structural component [A]
3: Structural component [C] and structural component [B] or structural component [D]
4: Axial direction of any fiber bundle
5: Cross-section to be observed
6: Structural component [A]
7: Resin area including structural component [C]
8: Resin area including structural component [B] or structural component [D]
9: Observation image
10: Interface
11: Baseline
12: Perpendicular baseline
13: Cross-sectional curve

The invention claimed is:

1. A prepreg comprising the following structural components [A], [B], [C], and [E], wherein

[C] is present on a surface of the prepreg,

[C] is a crystalline thermoplastic resin having a glass transition temperature of 100° C. or higher or an amorphous thermoplastic resin having a glass transition temperature of 180° C. or higher, the reinforcing fibers [A] are present which are included in a resin area including [B] and a resin area including [C] across an interface between the two resin areas,

[E] is included in the structural component [B], and the structural component [E] is included in an amount of 3 parts by mass or more and 30 parts by mass or less based on 100 parts by mass of the structural component [B]:

[A] reinforcing fibers;
[B] a thermosetting resin; a-
[C] a thermoplastic resin; and
[E] a thermoplastic resin soluble in a thermosetting resin.

2. The prepreg according to claim 1, wherein, in a planar view of the prepreg, when a cross-section perpendicular to a plane of the prepreg including the [A] is obtained from a direction of an angle different by 45 degrees to a direction of any fiber [A] included in the two resin areas, a cross-sectional curve, formed by the interface between the two resin areas closely adhering to each other, in the cross-section, has an average roughness length RSm, defined in accordance with JIS B0601 (2001), of 100 μm or less, and an average roughness height Rc of 3.5 μm or more.

3. The prepreg according to claim 2, wherein the average roughness height Rc is 10 μm or more.

4. The prepreg according to claim 1, wherein the resin area including the [B] and the resin area including the [C] are adjacent to each other in a layered state to form the interface.

5. The prepreg according to claim 1, wherein the structural component [C] is selected from a polyarylene ether ketone and a polyetherimide.

6. The prepreg according to claim 5, wherein the structural component [C] is a polyarylene ether ketone having a melting point of 200° C. to 340° C.

7. The prepreg according to claim 1, wherein the structural component [E] is in a dissolved state.

8. The prepreg according to claim 1, wherein the structural component [E] is a polyethersulfone or a polyetherimide.

9. The prepreg according to claim 1, wherein the structural component [A] includes a carbon fiber having a strand tensile strength of 5.5 GPa or more.

10. A laminate wherein a prepreg according to claim 1 forms at least a part of layers in the state of a cured product.

11. The laminate according to claim 10, wherein the structural component [C] is present on the surface.

12. The laminate according to claim 10, wherein the structural component [C] is present between layers.

13. A molding comprising a laminate according to claim 11, wherein the laminate is integrated with another member by joining the member to a surface of a structural component [C].

14. A laminate comprising a layer including the following structural components [A], [C], [D], and [E], wherein
[C] is a crystalline thermoplastic resin having a glass transition temperature of 100° C. or higher or an amorphous thermoplastic resin having a glass transition temperature of 180° C. or higher,
the reinforcing fibers [A] are present which are included in a resin area including [C] and a resin area including [D] across an interface between the two resin areas,
[E] is included in the structural component [D], and
the structural component [E] is included in an amount of 3 parts by mass or more and 30 parts by mass or less based on 100 parts by mass of the structural component [D]:
[A] reinforcing fibers;
[C] a thermoplastic resin;
[D] a cured product of a thermosetting resin, and
[E] a thermoplastic resin soluble in a thermosetting resin.

15. The laminate according to claim 14, wherein, in a planar view of the laminate, when a cross-section perpendicular to a plane of the laminate including the [A] is obtained from a direction of an angle different by 45 degrees to a direction of any fiber [A] included in the two resin areas,
cross-sectional curve, formed by the interface between the two resin areas closely adhering to each other, in the cross-section, has an average roughness length RSm, defined in accordance with JIS B0601 (2001), of 100 μm or less, and an average roughness height Rc of 3.5 μm or more.

16. The laminate according to claim 1, wherein the structural component [C] is present on the surface.

17. The laminate according to claim 14, wherein the structural component [C] is present between layers.

18. The laminate according to claim 14, wherein the structural component [C] is selected from a polyarylene ether ketone and a polyetherimide.

19. The laminate according to claim 18, wherein the structural component [C] is a polyarylene ether ketone having a melting point of 200° C. to 340° C.

20. The laminate according to claim 14, wherein the structural component [E] is in a dissolved state.

21. The laminate according to claim 14, wherein the structural component [E] is a polyethersulfone or a polyetherimide.

22. The laminate according to claim 14, wherein the average roughness height Rc is 10 μm or more.

23. The laminate according to claim 14, wherein the structural component [A] includes a carbon fiber having a strand tensile strength of 5.5 GPa or more.

* * * * *

UNITED STATES PATENT AND TRADEMARK OFFICE
CERTIFICATE OF CORRECTION

PATENT NO. : 11,878,478 B2
APPLICATION NO. : 17/611697
DATED : January 23, 2024
INVENTOR(S) : Jun Misumi, Masato Honma and Kyoko Shinohara It is certified that error appears in the above-identified patent and that said Letters Patent is hereby corrected as shown below:

On the Title Page

Item (56), Column 2 (Other Publications), Delete "Polyethermide," and insert -- Polyetherimide, --.

In the Claims

In Claim 1, Column 21, Line 2, after "resin;" delete "a-".

In Claim 13, Column 21, Line 42, delete "11," and insert -- 10, --.

Signed and Sealed this
Second Day of April, 2024

Katherine Kelly Vidal
*Director of the United States Patent and Trademark Office*